May 22, 1945. P. K. SAUNDERS 2,376,388
CONTROLLING VALVE
Original Filed March 16, 1942 2 Sheets-Sheet 1
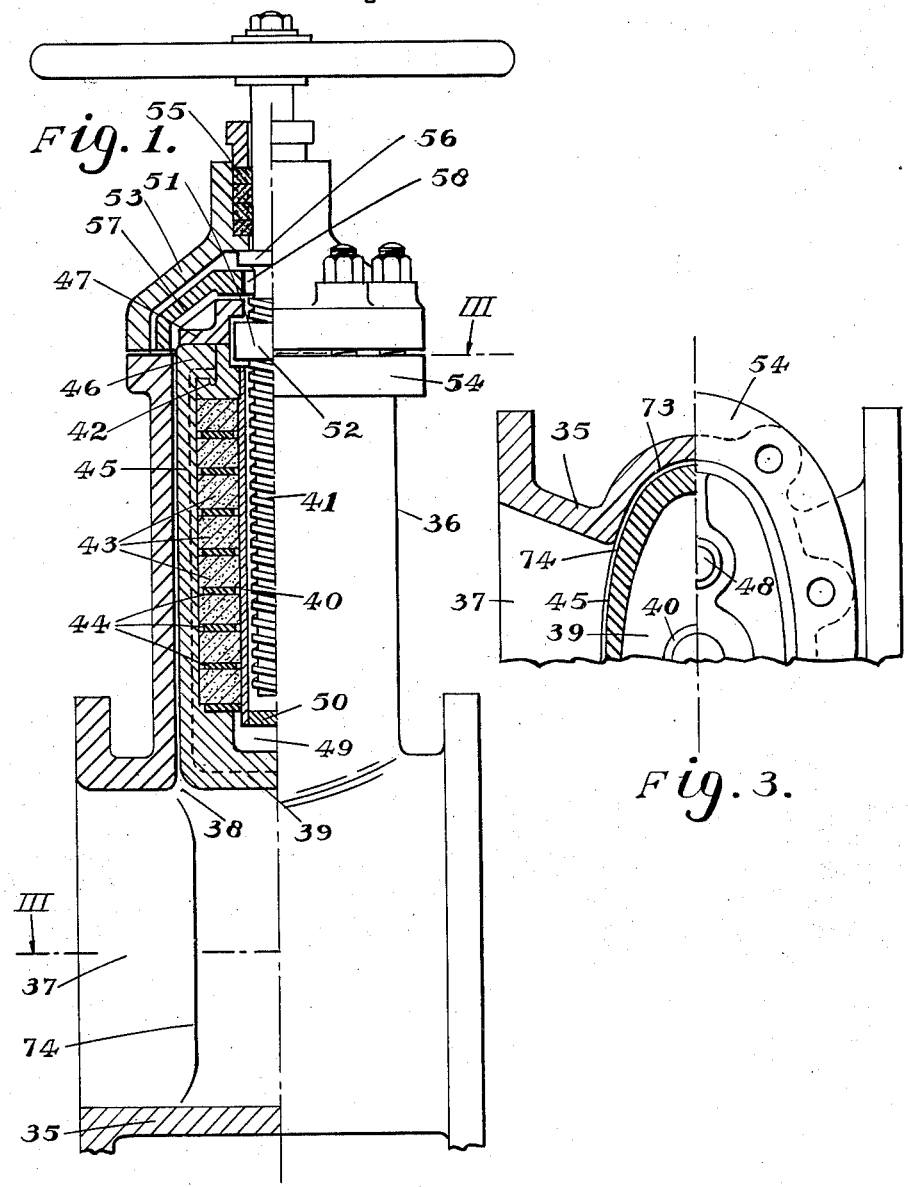
Inventor
P. K. Saunders
By Simon Broder Attorney

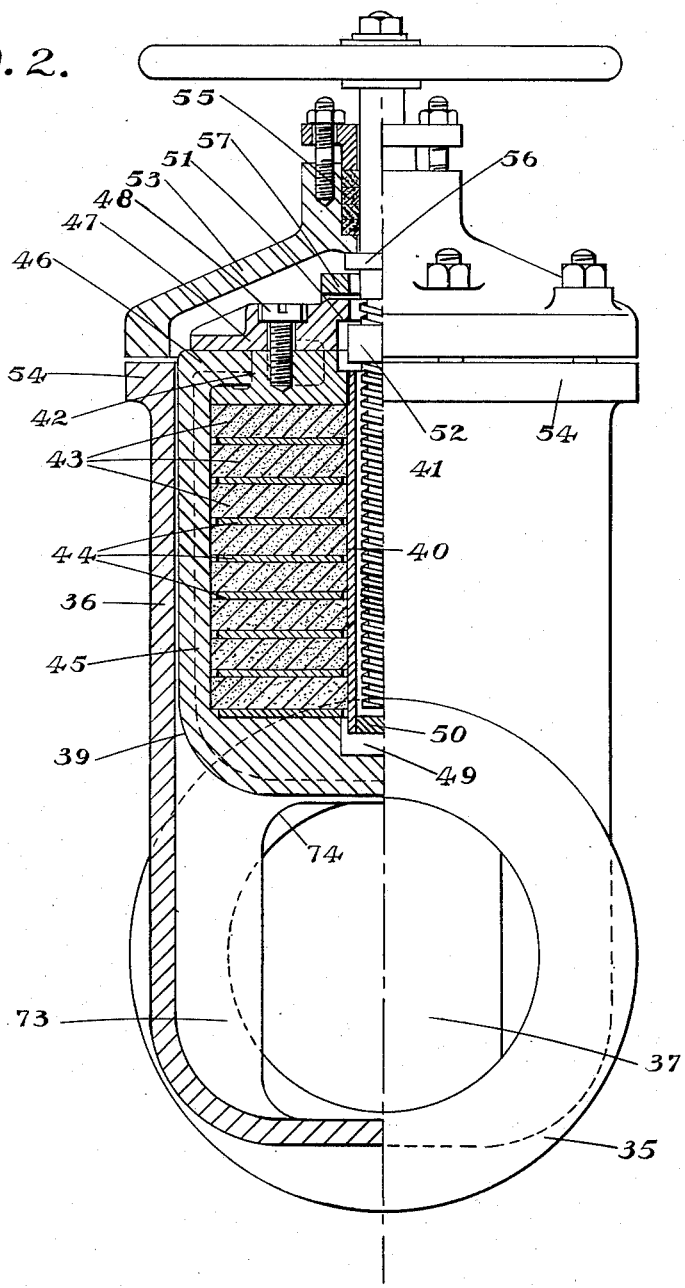

Patented May 22, 1945

2,376,388

UNITED STATES PATENT OFFICE 2,376,388

CONTROLLING VALVE

Philip Keith Saunders, Mamaroneck, N. Y.

Application March 16, 1942, Serial No. 434,939, which is a division of application Serial No. 225,436, August 17, 1938, now Patent No. 2,290,251, dated July 21, 1942. Divided and this application July 30, 1943, Serial No. 496,758. In Great Britain August 20, 1937

3 Claims. (Cl. 251—159)

This invention relates to fluid control valves for controlling the flow through the valve of liquids, gases, sludges and the like, of the type in which a closure member is moved transversely cross the bore of the valve. This application is a division of application Serial No. 434,939, filed March 16, 1942, said last mentioned application being a division of application Serial No. 225,436, filed August 17, 1938, now Patent 2,290,251, issued July 21, 1942.

A principal object of the invention is to provide such a valve having a straight through bore without the usual pocket or recess with which the closure member cooperates as in the standard form of gate valve. Such a recess collects solid matter when the valve is controlling a sludge and thus eventually interferes with the proper functioning of the valve. Furthermore, when such a valve is controlling milk, beer or similar liquids, a small quantity of liquid is trapped in the recess and may putrefy.

A further object is to provide such a valve with a closure member of rubber or other resilient material and to construct the valve in such a way that the surface of the closure member is not rubbed on or dragged across the surface of the bore but only moved normally to it while in contact with the bore.

A still further object is to provide an inexpensive, compact, robust and reliable valve from which satisfactory results will be obtained when controlling any kind of fluid.

With these and other objects in view the present invention consists primarily of a valve body having a substantially straight through bore with a substantially flat or continuously aligned (in the direction of the axis of the bore) well on one side of the bore and a port in the other side of the bore, a resilient plug of cross section corresponding to the port and slidably mounted for movement through it, and valve operating means for moving the plug from a position retracted through the port leaving the bore substantially unimpeded to a position compressed against the opposite side of the bore and thereby expanded to seal both bore and port.

Usually the plug is cylindrical and of greater diameter than that of the bore and is slidably mounted within a cylindrical chamber mounted transversely on the valve body so as to communicate with the bore through the port. The chamber may be either integral with the valve body or a separate member.

The resilient plug is usually made of hard rubber having a hardness comparable with that of a soft wood such as deal, but in some cases may be composite and reinforced.

Actuation of the valve may be effected manually by screw mechanism mounted in a domed cover or bonnet fitted to the top of the chamber accommodating the plug.

These and other features of the invention are hereinafter more fully described with reference to the accompanying drawings, in which—

Fig. 1 is an elevation half in section of a valve in accordance with the invention.

Fig. 2 is another elevation half in section at right angles to that in Fig. 1.

Fig. 3 is a section on the line III—III of Fig. 1 with the plug in the valve closing position.

In the valve shown, an elliptical plug 39 is arranged with its major axis perpendicular to the axis of the bore. The valve body 35 and a transverse chamber 36 communicating with the bore 37 of the body through a port 38 are cast in one piece. The chamber 36 has an elliptical cross section corresponding to that of the plug. The contour of the chamber 36 is continued into the bore 37 of the valve body 35, that is to say, there are pockets 73 in the sides of the bore 37 whose contour corresponds with that of the parts about the extremities of the major axis of the elliptical chamber 36. The ends of the bore 37 of the valve body communicate with this latter part of the bore opposite the chamber through rectangular openings 74, the walls of the bore 37 being merged gradually from a circular contour at the ends to these rectangular openings 74. To give an indication of the relative dimensions of the valve body, in a 10" valve, for example, the elliptical plug may have a major axis of length 12½" and a minor axis of length 6¼"; the valve body may have a length of 12½" overall and the rectangular openings in its bore mentioned above may be 10" high by 7½" wide. Thus the bore provides full flow area throughout its length.

The resilient plug 39 is preferably composite and reinforced and may be built up as follows. A central metal tube 40 with a closed lower end 50 which accommodates a non-rising actuating spindle 41 forms the basis of reinforcement. Integral with this tube or mounted on it at its top is an elliptical cap 42 of somewhat smaller dimensions than the plug 39 itself. Surrounding the tube are a series of soft rubber elliptical lozenges 43 interspersed with elliptical metal discs 44, both rubber lozenges and discs being of similar size to the cap and free to slide relatively to the tube. The plug is completed by an outside envelope 45 of relatively hard rubber having an inturned lip 46 at its top end which is secured by an elliptical plate 47 attached to the cap 42, as, for example, by screws 48, thus clamping the lip 46 of the envelope around its periphery. The outer envelope 45 is in contact with the sides of the soft rubber lozenges and with the lower face of the bottom lozenge, but there is substantial clearance 49 between it and the bottom 50 of the tube 40. In this way when compressed axially the plug 39 expands laterally, uniformly throughout its length, despite the reinforcement, since the soft rubber lozenges 43 and the envelope 45 are free to move relatively to the reinforcing tube 40.

The clamping plate 47 has an aperture in register with the main reinforcing tube and forms with the cap 42 a square recess 51 which accommodates a nut 52 with which the actuating spindle 41 co-operates. The nut 52 is thereby prevented from rotating relatively to the plug and from axial movement relatively to it.

The top of the chamber 36 is enclosed by a bonnet 53 of elliptical contour bolted around by its periphery to a flange 54 surrounding the chamber. The spindle 41 which has the usual handwheel keyed to its passes through a conventional stuffing box 55 in the centre of the bonnet 53. The spindle 41 has a collar 56 bearing against the inside surface of the bonnet 53. A bridge 57 supported at each end of the top of the chamber 36 at opposite ends of the minor axis of its elliptical periphery, has a central aperture 58, through which the spindle 41 passes and upon the sides of which the collar 56 rests, thus preventing axial movement of the spindle 41 relatively to the bonnet 53.

Conveniently the tube 40 forming the main reinforcement of the plug 39 is filled with a lubricant before assembly, so that each time the valve is opened the actuating spindle 41 is lubricated, and then when closed again transmits the lubricant to its co-operating nut 52.

A valve such as has been described is considerably lighter than a corresponding valve with a cylindrical plug and moreover, such a valve may be made with the body of overall length comparable to that of standard forms of sluice valve.

It should be understood that the method of reinforcing the plug just described whereby the body of the plug and radial reinforcement is free to move axially relatively to the axial reinforcement is equally applicable to any of the valves, but particularly large size valves, in accordance with the invention.

What I claim is:

1. In a valve, a closure member comprising a cap with a central aperture, a cylindrical lubricant retaining tube mounted on said cap with its open end registering with said aperture, a plurality of similar resilient lozenges interleaved with similar rigid plates all with central apertures and mounted on said tube, a resilient envelope enclosing said lozenges and plates but providing a space opposite the closed end of said tube, and a plate mounted on said cap thereby clamping the edge of said envelope between it and said plate.

2. In a valve, a closure member comprising an elliptical cap with a central aperture, a cylindrical lubricant retaining tube mounted on said cap perpendicular thereto with its open end registering with said aperture, a plurality of similar elliptical resilient lozenges interleaved with elliptical rigid plates all with central apertures and mounted on said tube, a resilient envelope enclosing said lozenges and having a depression opposite the closed end of said tube, and a plate mounted on said cap and thereby clamping the elliptical circumferential edge of said envelope between it and said cap.

3. In a valve, a closure member comprising a plurality of rigid plates interleaved with resilient plates, and a resilient envelope completely enclosing said plates on all sides of the closure member which may come into contact with the fluid.

PHILIP KEITH SAUNDERS.